Figure 1:
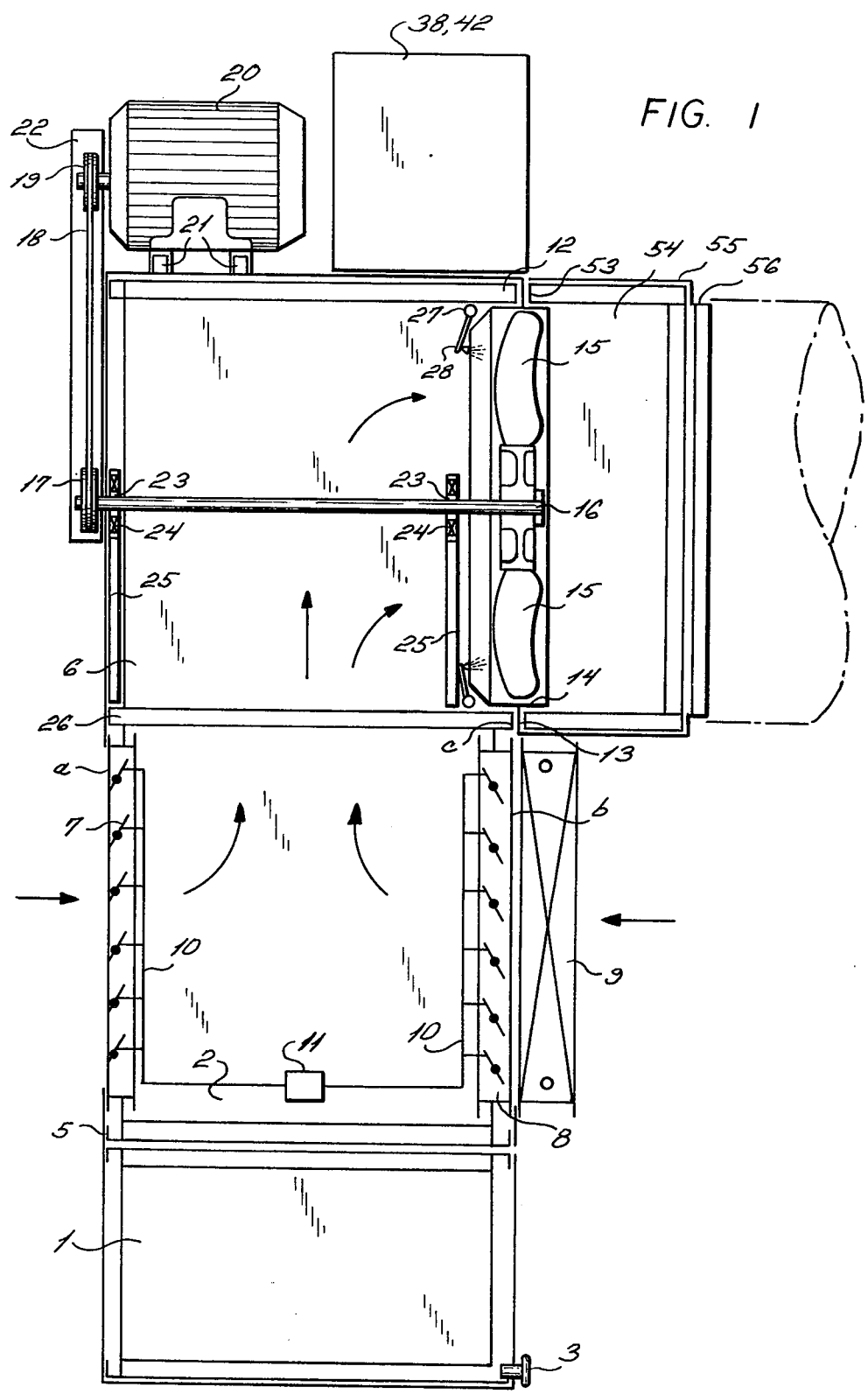
Figure 2:
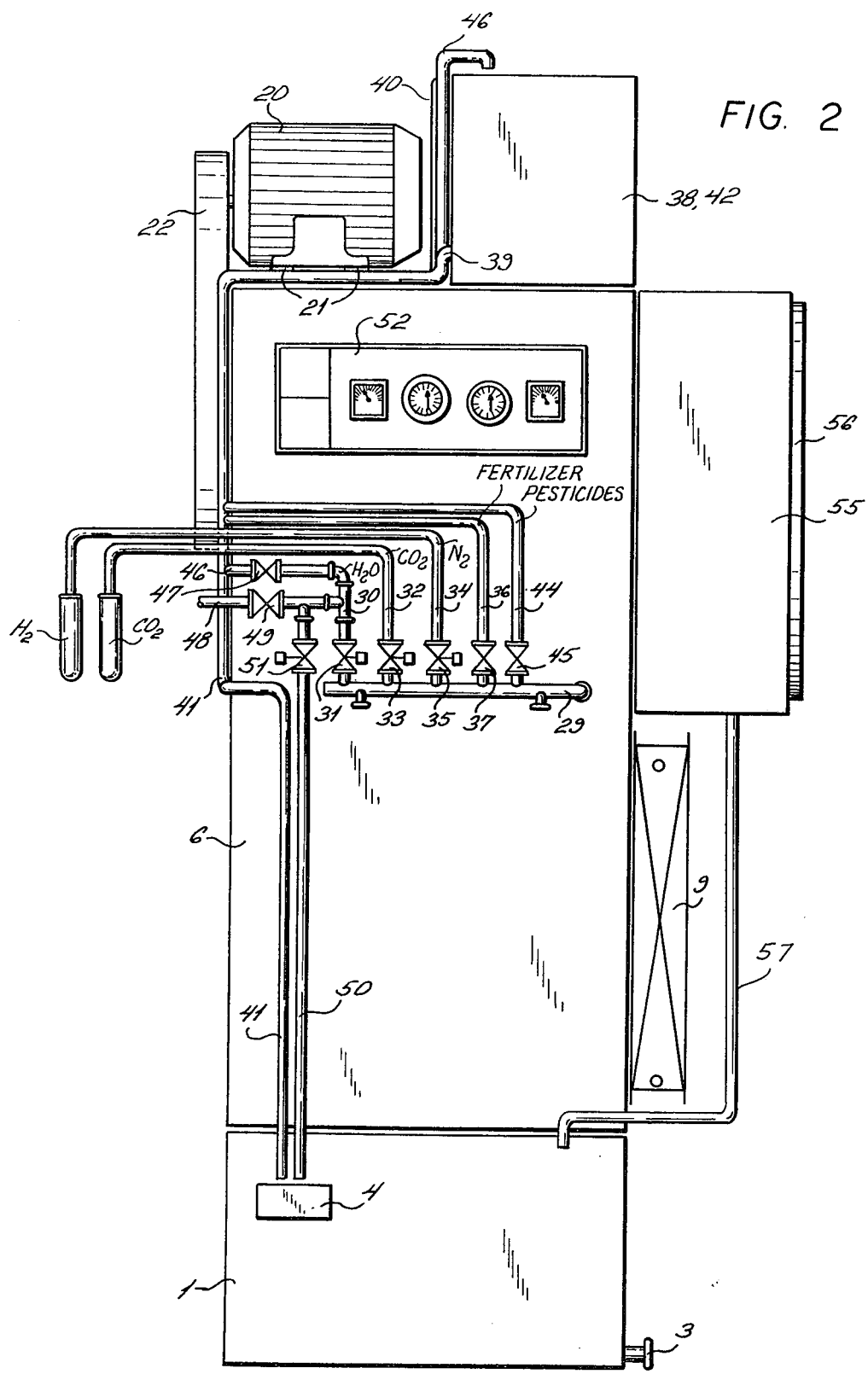
Figure 3:
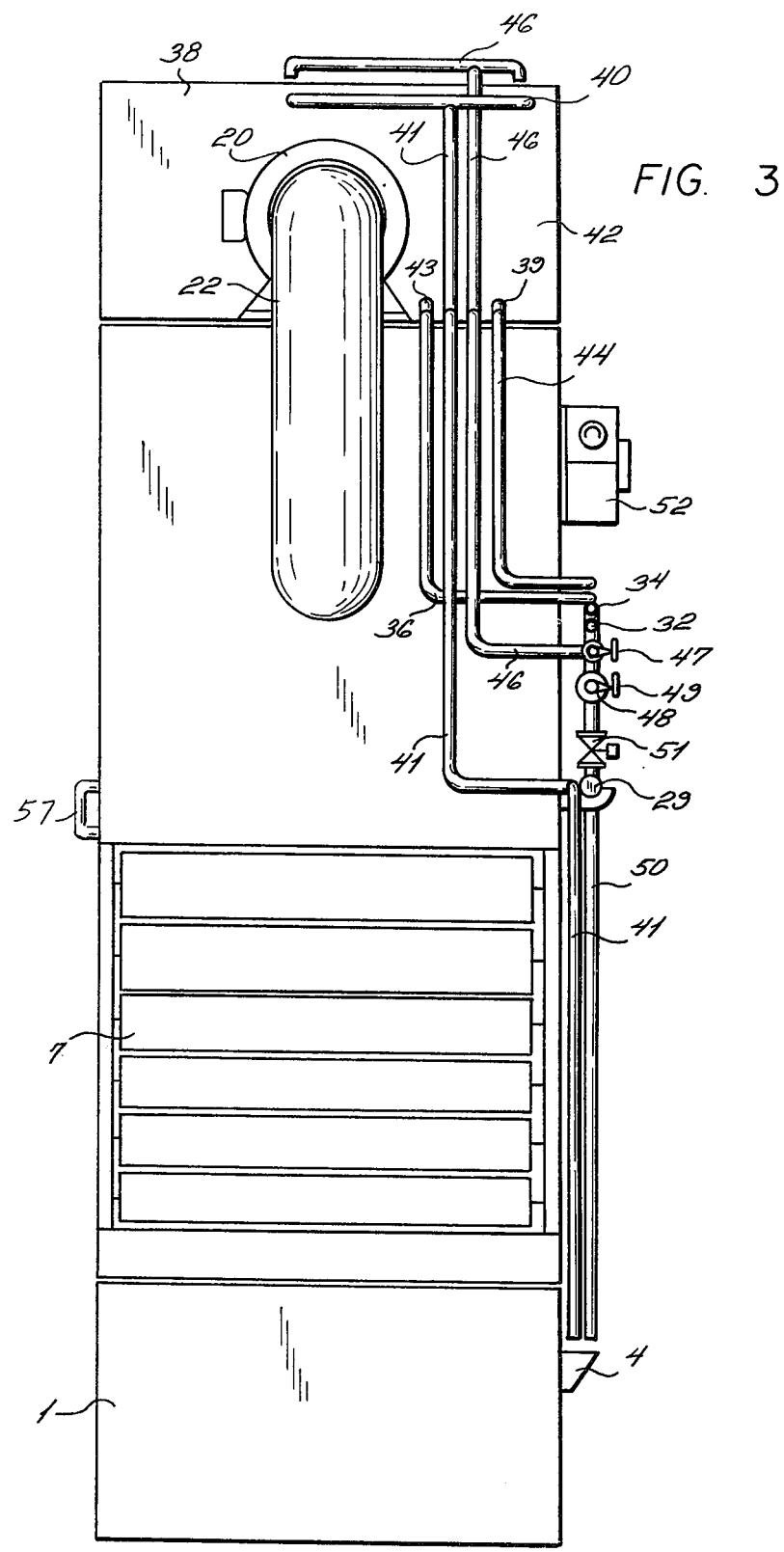
Figure 4:
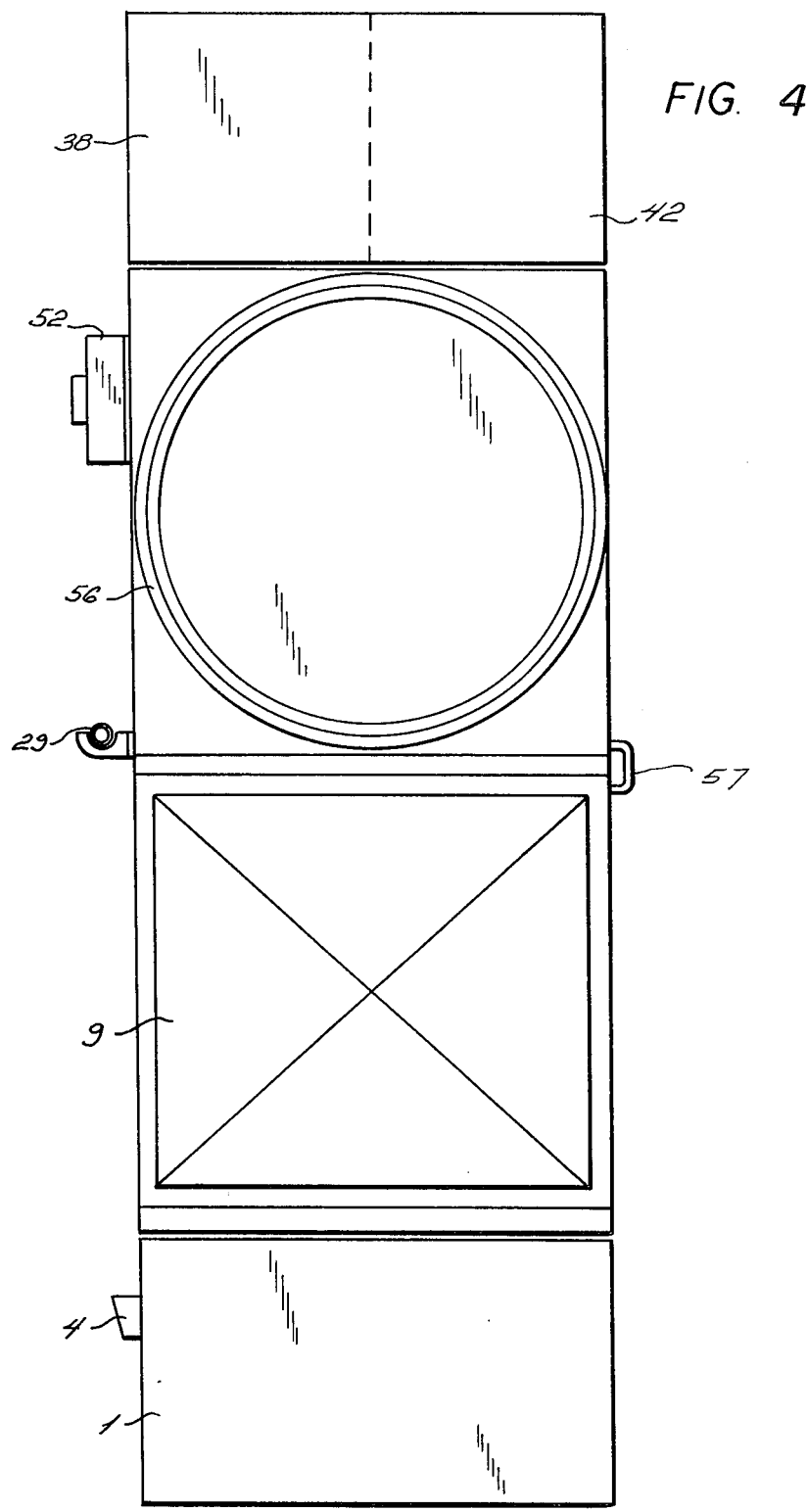
Figure 5:
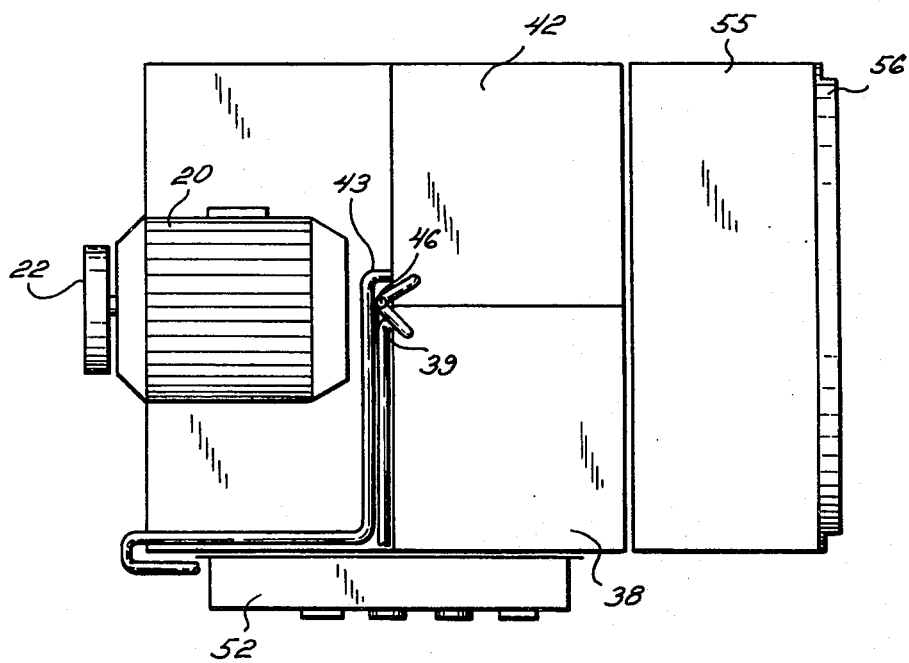

United States Patent [19]
Ceausescu et al.

[11] 3,956,852
[45] May 18, 1976

[54] AIR AND SOIL TREATMENT APPARATUS FOR A GREENHOUSE

[75] Inventors: Ion Ceausescu; Petre Constantinescu, both of Bucharest; Emil Oachis, Cluj; Nicolae Cristea, Bucharest, all of Romania

[73] Assignee: Intreprinderea Metalul Rosu Cluj, Cluj, Romania

[22] Filed: Feb. 28, 1975

[21] Appl. No.: 554,317

[30] Foreign Application Priority Data

Mar. 10, 1974 Romania ........ 77879

[52] U.S. Cl. ........ 47/17; 98/33 A; 165/12; 165/21

[51] Int. Cl.² ........ A01G 9/00

[58] Field of Search ........ 47/1.2, 17; 98/33; 165/2, 60, 21, 12

[56] References Cited
UNITED STATES PATENTS

| | | | |
|---|---|---|---|
| 1,827,530 | 10/1931 | Le Grand | 47/17 X |
| 1,912,209 | 5/1933 | Lassen et al. | 47/17 |
| 2,193,911 | 3/1940 | Wright | 47/17 |
| 3,063,195 | 11/1962 | Ravich | 47/17 |
| 3,108,399 | 10/1963 | Fraser | 47/17 |
| 3,124,903 | 3/1964 | Truhan | 47/17 |
| 3,383,179 | 5/1968 | Tibbits | 47/17 UX |
| 3,446,272 | 5/1969 | Gaines | 47/17 X |
| 3,575,235 | 4/1971 | Davis et al. | 47/17 X |

*Primary Examiner*—Robert E. Bagwill
*Attorney, Agent, or Firm*—Karl F. Ross; Herbert Dubno

[57] ABSTRACT

An upright rectangular housing provided with air driving means for generating an airstream into which a number of ingredients, necessary to the life support of vegetation within a greenhouse, is injected for airborne distribution throughout the greenhouse, in addition to a ground level irrigation system fed by a reservoir in the housing containing the liquid components of the ingredients, while the temperature of the greenhouse is controlled by a pair of air intakes in the housing which selectively admit recycled air through a heater which raises the temperature when necessary or outside air if the temperature is to be lowered. Additional cooling is achieved by the adiabatic heat transfer of a water spray or the expansion of a gas within the housing of the apparatus.

3 Claims, 5 Drawing Figures

U.S. Patent  May 18, 1976  Sheet 1 of 5  3,956,852

AIR AND SOIL TREATMENT APPARATUS FOR A GREENHOUSE

FIELD OF THE INVENTION

The present invention relates to an air and soil treatment apparatus for greenhouses and, more particularly, to an apparatus for creating within a greenhouse a specific environment favorable to the growth of vegitation, in which the temperature and humidity are controlled, as well as the introduction of fertilizer and pesticides.

BACKGROUND OF THE INVENTION

Devices for controlling the temperature and humidity of the air within a greenhouse are known. However, these devices have the disadvantage in that they do not control the application of fertilizers or pesticides either directly to the soil or the air, simultaneously with the other functions of the apparatus. In addition, all the cited functions which would be ideally handled by a single apparatus are now usually handled by separate devices loosely linked together in an aggregate.

OBJECT OF THE INVENTION

It is therefore an object of the present invention to provide an improved air and soil treatment apparatus for a greenhouse which can heat, cool, humidify, water, fertilize and apply pesticide simultaneously or in any sequence.

It is another object of the present invention to provide an improved air and soil treatment apparatus for a greenhouse which can heat, cool, humidify, water, fertilize and apply pesticide simultaneously or in any sequence from a single unit.

SUMMARY OF THE INVENTION

The above and other objects of the invention are realized in an apparatus having an upright, rectangular configuration at the bottom of which is provided a reservoir connected to a ground level irrigation system of the drip nozzle type. Above the reservoir is a blending chamber having rectangular openings formed in opposite facing walls with adjustable dampers set in each opening which are connected by a linkage to a common control. One set of dampers can be opened for the admission of outside air for the purpose of cooling within the greenhouse. The other set of dampers are aligned with a heating battery on the downstream side through which recirculated air passes prior to entering the blending chamber and which can be heated for raising the temperature of the greenhouse.

Above the blending chamber is a rectangular fan chamber formed with a circular window in one wall in which a motor driven fan is positioned. Adjacent the fan on the downstream side and arranged around the periphery thereof are a plurality of nozzles in the form of inwardly projecting fingers which are fed from a collecting pipe into which several media, necessary to the life support of the vegitation, are fed.

Downstream of the fan chamber in a rectangular extension thereof, is a demister for removing large water droplets which may become entrained in the airstream.

Mounted on top of the apparatus, above the fan chamber, is a holding tank partitioned into two compartments containing fertilizer and a pesticide, the two compartments being fed by a waterline for liquifying the fertilizer and pesticide, which usually is supplied in powder form. Any overflow from this process is fed to the reservoir. Each compartment is connected by a pipeline having a control valve to the common collecting pipe, where the pesticide and fertilizer are fed to the nozzles.

A source of carbon dioxide gas and nitrogen gas are each connected by a pipeline and control valve to the collecting pipe, along with water from the greenhouse mains, which can be directed by a series of pipelines and valves to either the collecting pipe, the reservoir or the holding tank.

The different media necessary to the life support of the vegetation can be introduced into the airstream separately or together, in any combination and in any ratio, whereby they are directed throughout the greenhouse by a distribution system. The different ingredients of the airstream that are removed by the demister are fed by a drain line to the reservoir, where they mix with the overflow from the holding tank and additional water, the mixture being fed to the ground level irrigation system, providing a supplement to the airborne life support system.

The temperature of the greenhouse is controlled, in part by the adjustment of the dampers and heating battery. However, when the outside air is not cold enough to lower the temperature within the greenhouse to the necessary level, additional cooling can be achieved by spraying water into the airstream and cooling it by adiabatic heat exchange. If sufficient cooling is still not attained, either nitrogen gas or carbon dioxide gas can be sprayed into the airstream, where the more efficient adiabatic heat exchange of an expanding gas will lower the temperature much more than water.

BRIEF DESCRIPTION OF THE DRAWING

The above and other objects, features, and advantages will become apparent from the following description, reference being made to the drawing, in which:

FIG. 1 is a vertical section through the apparatus;

FIG. 2 is a side view of the apparatus;

FIG. 3 is a front view of the apparatus;

FIG. 4 is a back view of the apparatus; and

FIG. 5 is a top view of the apparatus.

SPECIFIC DESCRIPTION

The apparatus shown in the drawings has a rectangular, upright configuration and is similar in construction and operation to the apparatus described in copending U.S. application Ser. No. 488,927, filed July 16, 1974.

As shown in FIG. 1 a reservoir 1, provided in the lower portion of the apparatus, is formed with a nipple 3 which feeds into an irrigation system of the drip nozzle type similar to that shown in copending U.S. application Ser. No. 485,295, filed July 2, 1974. Above the reservoir 1 a rectangular blending chamber 2 is provided with rectangular windows *a* and *b* formed in opposite facing walls of the chamber and provided with adjustable dampers 7 and 8 which are connected by a linkage 10 and actuated by a control 11, which can open dampers 7 for the admission of fresh air or dampers 8 for the admission of recirculated air. Aligned with the window *b* on the downstream side thereof is a heating battery 9 through which a fluid heating medium can be passed for raising the temperature of the recirculated air.

Above the blending chamber 2 and downstream thereof, is a rectangular fan chamber 6 provided with a circular window c in which a fan 15 is positioned surrounded by a circular cowling 14. The fan 15 is mounted on a drive shaft 16 which is journaled in bearings 24 provided on supports 25 within the fan chamber 6. The shaft 16 is driven by a pulley 17 mounted thereon and a belt 18 which is driven by a motor 20 through a pulley 19, the motor 20 having mounting adjustments 21 for controlling the tension of belt 18, the belt and pulley system being enclosed in a protective housing 22.

Downstream of the fan 15 is a housing 55 which forms a rectangular extension of the chamber 6 and contains a demister 54 of the type described in Chemical Engineers' Handbook, ed. by John H. Perry on page 18-85 of the fourth edition (McGraw-Hill Book Co., Inc. N.Y. 1963) for removing any large water droplets which may become entrained in the air flow generated by the fan 15. Downstream of the demister 54 an opening is formed in the wall of the housing 55 opposite the fan 15 surrounded by an annular flange 56 onto which can be fitted a distribution system for the treated air, such as that shown in the above mentioned copending application Ser. No. 485,295.

Immediately upstream of the fan 15 are a plurality of nozzles 28 in the form of inwardly projecting fingers arranged around the periphery of the cowling 14 in a spaced relationship with each other and fed by a pipe 27 which is connected to a collecting pipe 29, fastened outside of the apparatus and on a wall thereof.

Mounted above the apparatus on top of the fan chamber 6 is a holding tank partitioned into two compartments 38 and 42. The compartment 42 contains a pesticide and the compartment 38 contains a fertilizer, both compartments being fed with water from a common pipeline 46 which is provided with a pair of arms, each of which extend over a compartment of the holding tank. The pipeline 46 is connected through a valve 47 to a water line 48 which is in turn connected through a valve 49 to the greenhouse mains.

The compartments 38 and 42 are also provided with overflow means in the form of a pair of branches which extend from the upper level of each compartment to a common drain line 41, which feeds the excess pesticides and fertilizer to the reservoir 1 by way of turnover flapper valve 4 provided thereon. The reservoir 1 is also supplied with plain water through the valve 4 by a pipeline 50 which is connected through a manual or solenoid valve 51 to the water line 48. Additional liquids are supplied to the reservoir 1 by a drain line 57 which feeds collected liquids from the demister 54 in housing 55.

Pesticides from compartment 42 can be fed to the nozzle 28 by way of outlet 39 formed in that compartment and connected to pipeline 44 which feeds into the collecting pipe 29 through a control valve 45.

In a similar manner, fertilizer from compartment 38 can be fed to the nozzles 28 by way of outlet 43 formed in that compartment and connected to pipeline 36 which feeds into the collecting pipe 29 through a control valve 37.

A source of nitrogen gas, necessary to the life-support of growing vegetation, is connected to a pipeline 34 which feeds the gas through a manual or solenoid valve 35 to the collecting pipe 29, where it is passed to the nozzles 28.

Another source of life-supporting gas, carbon dioxide, is connected to a pipeline 32 which feeds the gas through a manual or solenoid valve 33 to the collecting pipe 29.

Finally, another pipeline 30, connected to waterline 48, feeds through a manual or solenoid valve 31 to the collecting pipe 29.

In operation, a sensing panel 52, having elements responsive to light, temperature, humidity and time and programmable according to the particular needs of the specific vegetation being cared for, can be used to control various operations of the apparatus.

If for instance, the temperature within the greenhouse becomes too low, the fan 15 is switched on, either manually or automatically and the dampers 8 are opened by the control 11, either manually or automatically while the heating battery 9 is activated, raising the temperature of the air being circulated throughout the greenhouse, and if being automatically controlled, raising the temperature slightly above the ideal, providing some latitude so that the apparatus is not constantly switching on and off.

If the temperature within the greenhouse becomes too high the fan 15 switches on and the control 11 closes the dampers 8 and opens the dampers 7 to admit cooler outside air, which is circulated throughout the greenhouse. If the temperature of the outside air is not sufficient to drop the temperature within the greenhouse to the desired ideal, the valve 31 in pipeline 30 is opened, feeding water at ambient temperature to the nozzles 28, where the air is cooled by the adiabatic heat exchange of the water spray. If this is still not sufficient to drop the temperature of the air to the desired level, the water spray can be shut off and either valve 33 or 35 can be opened to feed either carbon dioxide gas or nitrogen gas to the nozzle 28 where the adiabatic heat exchange between the air and the expanding gas is much more efficient, thereby driving the temperature of the air down much lower than with the water spray.

When it is desired to spray carbon dioxide gas or nitrogen gas into the airstream for nourishment of the vegetation, the resultant drop in air temperature caused by the expanding gases can be compensated for by the opening of dampers 8 and the activation of the heating battery 9. In a similar manner, the introduction of the water spray for the purpose of raising the humidity of the atmosphere in the greenhouse will have much the same effect as the introduction of the gases and can be handled in the same way.

Additional airborne nourishment of the vegetation can be provided by the introduction into the airstream of a fertilizer from the compartment 38, which feeds through the pipeline 36 when the valve 37 is opened, to the nozzles 28.

When necessary, the pesticide from compartment 42 can be introduced into the airstream by way of pipeline 44 and valve 45 which feed into the nozzles 28.

Prior to being introduced into the airstream the fertilizer and pesticide, which are usually supplied in a dry state, are liquified in their respective compartments by water supplied from pipeline 46 which feeds into the respective compartments. During this process, it sometimes happens that too much water is fed into the compartments, causing an overflow which is fed by the drain line 41 to the reservoir 1. In addition, droplets of fertilizer and pesticide gathered by the demister 54 are fed by the drain line 57 to the reservoir 1 where they can be mixed with additional water supplied to the reservoir by the pipeline 50, the mixture then being fed to a ground level irrigation system, providing treatment directly to the soil in addition to the airborne treatment.

We claim:

1. An air and soil treatment apparatus for a greenhouse comprising:
   a rectangular upright housing disposed in said greenhouse;
   a reservoir formed at the bottom of said housing for supplying a ground-level irrigation system with liquid, said housing having side walls defining an upwardly open first chamber formed above said reservoir;
   a first intake window formed in one of said side walls and connected with a source of air outside said greenhouse, and a second intake window formed in another of said side walls and opening into said greenhouse;
   heating means spanning said second intake window for heating recycled air;
   adjustable, selectively operable dampers provided in each of said windows;
   said housing being formed with other walls defining a downwardly open second chamber above said first chamber and communicating therewith;
   a discharge window formed in one of the walls of said second chamber;
   a fan positioned in said discharge window;
   a motor mounted on top of said housing externally of said chambers;
   means for operably connecting said motor to said fan for driving same;
   spraying means in said second chamber upstream of said fan;
   a source of water connected to said spraying means and said reservoir and a valve for adjusting the flow thereof;
   a source of carbon dioxide gas connected to said spraying means and a valve for adjusting the flow thereof;
   a source of nitrogen-containing gas connected to said spraying means and a valve for adjusting the flow thereof;
   a source of liquefied fertilizer connected to said spraying means and said reservoir and a valve for adjusting the flow thereof to said spraying means;
   a source of liquefied pesticide connected to said spraying means and said reservoir and a valve for adjusting the flow thereof to said spraying means;
   said housing forming a third chamber downstream of said fan and said discharge window;
   a demister in said third chamber for removing large water droplets from an airstream generated by said fan;
   ducts means fo distributing said airstream into said greenhouse; and
   means for collecting said water droplets from said demister and feeding the collected droplets to said reservoir.

2. An air and soil treatment apparatus for a greenhouse as defined in claim 1 wherein:
   said source of liquefied fertilizer and said source of liquefied pesticide is a holding tank mounted on top of said housing externally of said chambers and formed with respective compartments containing said fertilizer and said pesticide; and
   overflow means in said compartments for feeding the excess contents thereof to said reservoir.

3. An air and soil treatment apparatus for a greenhouse as defined in claim 1 further comprising:
   means responsive to the temperature in said greenhouse operably connected to said dampers, said heater, and said valve for adjusting the flow of said water to said spraying means; and
   means responsive to the humidity in said greenhouse operably connected to said valve for adjusting the flow of said water to said spraying means.

* * * * *